United States Patent Office 3,118,945
Patented Jan. 21, 1964

3,118,945
PROCESS FOR PREPARING POLYFLUORO-
ALKYLAMINES
Werner V. Cohen, Glen Farms, Md., assignor to E. I. du
Pont de Nemours and Company, Wilmington, Del., a
corporation of Delaware
No Drawing. Filed Sept. 2, 1960, Ser. No. 53,604
8 Claims. (Cl. 260—583)

This invention relates to a process for preparing polyfluoroalkylamines, particularly from sulfonic acid esters of polyfluoroalkanols.

The polyfluoroalkylamines, obtained by the process of this invention, have the formula $X(CF_2)_nCH_2NRR'$ wherein X represents hydrogen or fluorine, $n$ is an integer of from 2 to 12 and each of R and R' represents hydrogen or an alkyl radical of 1 to 5 carbon atoms. Such polyfluoroalkylamines as a class are well known compounds which are useful as intermediates for the preparation of other compounds containing a polyfluoroalkyl group and for many other purposes. Particularly, the higher molecular weight amines in the form of their acid salts and their quaternary ammonium salts are useful as surface active agents, dispersing agents and as intermediates for the preparation of thioureas and other valuable compounds. They are particularly useful for making quaternary ammonium salts which are prepared by reacting the salt of the amine with a suitable alkylating agent. The resulting quaternary ammonium salts, particularly those made from methyl chloride and methyl iodide, are particularly useful as dispersants in the emulsion polymerization of such fluorine containing polymerizable materials as vinyl fluoride, tetrafluoroethylene, hexafluoropropene, and the like. The quaternary ammonium salts are also useful as leveling agents in waxes.

Heretofore, polyfluoroalkylamines of this class have been made by complex, high-cost processes. One process for making such polyfluoroalkylamines, for example, involves the oxidation of a polyfluoroalkanol to the corresponding polyfluoroalkanoic acid, the conversion of the acid to the acid chloride, the reaction of the acid chloride with ammonia to form the corresponding polyfluoroalkanoic acid amide, and the reduction of the acid amide to the polyfluoroalkylamine as disclosed by Carnahan et al. in Patent 2,646,449. In another process, an alkanoic acid is electrolyzed in an anhydrous hydrogen fluoride medium to provide a polyfluoroalkanoic acid fluoride, the acid fluoride is converted with ammonia to the corresponding amide, and the amide is reduced with lithium aluminum hydride to the polyfluoroalkylamine as disclosed by Husted et al. in Patent 2,691,043. A more direct process for making N-methylpolyfluoroalkylamines is to react tetrafluoroethylene with dimethylformamide and to hydrolyze the intermediate polyfluoroalkylamide to the N-methyl-polyfluoroalkylamine as disclosed by Ivan Pascal in his copending application Serial No. 798,829, filed March 12, 1959, now Patent No. 3,019,261.

It is an object of this invention to provide a direct, convenient, low-cost process for making primary polyfluoroalkylamines and their N-alkyl derivatives. Another object is to provide such a process which is simple and easy to carry out and which produces the polyfluoroalkylamines in high yields. Other objects are to advance the art. Still other objects will appear hereinafter.

The above and other objects may be accomplished in accordance with this invention which comprises reacting at a temperature of from about 125° C. to about 265° C. an aqueous dispersion of about 1 mole of a sulfonic acid ester of a polyfluoroalkanol with from about 2 to about 3 moles of a water-soluble base of the formula HNRR' wherein each of R and R' represents a member of the group consisting of hydrogen and an alkyl radical of 1 to 5 carbon atoms, said sulfonic acid having the formula $A-SO_2-OH$ wherein A represents a member of the group consisting of an aryl radical of 6 to 20 carbon atoms and 1 to 2 benzene rings, a halogen substituted aryl radical of 6 to 20 carbon atoms and 1 to 2 benzene rings in which the halogen substituents consist of 1 to 2 halogen atoms of the group consisting of chlorine and bromine, and a saturated hydrocarbon radical of 1 to 12 carbon atoms, and the polyfluoroalkanol has the formula $X(CF_2)_nCH_2OH$ wherein X represents a member of the group consisting of hydrogen and fluorine and $n$ represents an integer of from 2 to 12.

The polyfluoroalkanols, the sulfonic esters of which are used in the process of this invention, have the formula $X(CF_2)_nCH_2OH$ wherein X represents hydrogen or fluorine, preferably hydrogen, and $n$ represents an integer of from 2 to 12, preferably 2 to 8. The 1H,1H,ωH-polyfluoroalkanols, having the formula $H(CF_2)_nCH_2OH$, and methods of preparing them are disclosed by J. M. Joyce in Patent 2,559,628. Representative members of such polyfluoroalkanols are: 1H,1H,3H-tetrafluoro-1-propanol, $HCF_2CF_2CH_2OH$; 1H,1H,5H-octafluoro-1-pentanol, $H(CF_2)_4CH_2OH$; 1H,1H,9H-hexadecafluoro-1-nonanol, $H(CF_2)_8CH_2OH$; and 1H,1H,11H-eicosafluoro-1-undecanol, $H(CH_2)_{10}CH_2OH$. The 1H,1H-polyfluoroalkanols, having the formula $F(CF_2)_nCH_2OH$, and the method of preparing them are disclosed by Husted et al. in Patent 2,666,797. Representative members of this class of polyfluoroalkanols are: 1H,1H-pentafluoro-1-propanol, $FCF_2CF_2CH_2OH$; 1H,1H-nonafluoro-1-pentanol, $F(CF_2)_4CH_2OH$; 1H,1H - pentadecafluoro - 1 - octanol, $F(CF_2)_7CH_2OH$; and 1H,1H-heptadecafluoro-1-nonanol, $F(CF_2)_8CH_2OH$.

The sulfonic acids which are adapted for forming the esters of the polyfluoroalkanols that are employed as the starting materials in the process of this invention include the aromatic monosulfonic acids which have the formula $A-SO_2-OH$ wherein A represents a member of the group consisting of an aryl radical containing 1 to 2 benzene rings and a halogen substituted aryl radical containing 1 to 2 benzene rings in which the halogen substituents consist of 1 to 2 halogen atoms of the group consisting of chlorine and bromine, i.e. a halogen having an atomic number of from 17 to 35. An aryl radical containing 1 to 2 benzene rings is a radical of the benzene, biphenyl or naphthalene series which may contain alkyl substituents. Preferably, the alkyl substituents, when present, consist of 1 to 2 alkyl groups of 1 to 4 carbon atoms. Thus, the aryl radicals preferably contain only 6 to 20 carbon atoms and only 1 to 2 benzene rings. Representative sulfonic acids are benzenesulfonic acid, p-chlorobenzenesulfonic acid, p-bromobenzenesulfonic acid, p-toluenesulfonic acid, o-toluenesulfonic acid, m-toluenesulfonic acid, p-propylbenzenesulfonic acid, p-tert.-butylbenzenesulfonic acid, 2,4-xylenesulfonic acid, 2,5-xylenesulfonic acid, 1-naphthalenesulfonic acid, and 2-naphthalenesulfonic acid. The preferred aromatic sulfonic acids are the benzene and toluene monosulfonic acids, particularly the readily available p-toluenesulfonic acid and benzenesulfonic acid. It will be understood that "a toluene monosulfonic acid" is used in the strict, commonly understood sense to include only the isomeric unsubstituted toluene monosulfonic acids which may be represented by the formula

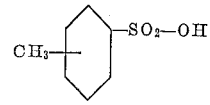

i.e. p-toluenesulfonic acid, o-toluenesulfonic acid, and m-toluenesulfonic acid.

The sulfonic acids which are adapted for forming the esters of the polyfluoroalkanols that are employed as the starting materials in the process of this invention also include the saturated hydrocarbon monosulfonic acids which have the formula A—$SO_2$—OH wherein A represents a saturated hydrocarbon radical of 1 to 12 carbon atoms, preferably 1 to 7 carbon atoms, which may be acylic or alicyclic. It will be understood that an acyclic radical is an open chain radical and, when A is acyclic, the sulfonic acid may be termed an alkanemonosulfonic acid. Also, an alicyclic radical means a saturated cyclic hydrocarbon radical which may contain one or more alkyl side chains. Representative sulfonic acids are methanesulfonic acid, ethanesulfonic acid, 1-propanesulfonic acid, 2-propanesulfonic acid, 1-butanesulfonic acid, 2-butanesulfonic acid, 1-pentanesulfonic acid, 1-heptanesulfonic acid, 1-octanesulfonic acid, 1-nonanesulfonic acid, 1-decanesulfonic acid, 1-dodecanesulfonic acid, cyclopentanesulfonic acid and cyclohexanesulfonic acid. The presently preferred saturated hydrocarbon monosulfonic acid is methanesulfonic acid.

The sulfonic acid esters of the polyfluoroalkanols are readily made by esterifying the sulfonic acids by methods known to the art such as that of Tiers et al. described in J.A.C.S., vol. 75, page 5978 (1953). The sulfonic acids and the methods of preparing them are, in general, well known to the art. The alicyclic sulfonic acids may be made by oxidizing the cyclic alkanethiols to sulfonic acids, Ber., 71, 285 (1938).

The sulfonic acid esters of the polyfluoroalkanols may, and preferably are obtained by reacting the sulfonyl chlorides of these acids with the alcohols. The sulfonyl chlorides of normally gaseous alkanes of one to 5 carbon atoms are readily made by reacting the alkane with chlorine and sulfur dioxide under the catalytic influence of actinic light as described by C. R. Reed in Patent 2,174,492. The sulfonyl chlorides of liquid n-alkanes, having from 5 to 12 carbon atoms, are similarly made by reacting the liquid alkane with a gaseous mixture of sulfur dioxide and chlorine in the presence of actinic light as described by Tinker and Fox in Patent 2,174,507.

The preparation of representative esters of aromatic sulfonic acids is disclosed in the following Examples A and B.

EXAMPLE A

*1H,1H,3H-Tetrafluoropropyl p-Toluenesulfonate*

Into a 5 liter flask, fitted with a stirrer, a thermometer, and a dropping funnel, were charged 880 g. of p-toluenesulfonyl chloride, 574 g. of 1H,1H,3H-tetrafluoro-1-propanol, and 1500 ml. of water. The mixture was heated to 50° C., and a solution of 200 g. of sodium hydroxide in 800 ml. of water was added dropwise over 1.5 hours, the temperature being kept at 50° C. to 60° C. The stirring was continued overnight at room temperature. The lower water-insoluble layer of product was separated. The upper aqueous layer was shaken with ether, and the ether solution of extracted material was added to the separated water-insoluble material. The combined products were dried over anhydrous magnesium sulfate, filtered, and freed of ether by evaporation. The product, distilling at 109–118° C. at 0.9 mm. pressure, amounted to 1158 g. or 93.3% of the theoretical yield and was identified by elemental analysis as 1H,1H,3H-tetrafluoropropyl p-toluenesulfonate. It had a boiling point of 131° C. at 3 mm., $n_D^{20}=1.4600$, sp. gr.=1.3970, and a M.P. of 14° C. to 16° C. Analysis:

| | Percent C | Percent H | Percent F | Percent S |
|---|---|---|---|---|
| Calculated for $C_{10}H_{10}F_4O_3S$ | 42.15 | 3.5 | 26.6 | 11.2 |
| Found | 41.9 | 3.6 | 26.0 | 11.2 |

EXAMPLE B

*1H,1H,9H-Hexadecafluorononyl p-Toluenesulfonate*

A 2 liter flask, fitted as described in A above, was charged with 209.6 g. of p-toluenesulfonyl chloride, 432 g. of 1H,1H,9H-hexadecafluoro-1-nonanol, and 375 ml. of water. The mixture was heated to 50° C. and a solution of 45.2 g. of sodium hydroxide in 160 ml. of water was added dropwise over 1.5 hours, the temperature being kept at 50° C. to 60° C. Stirring was continued overnight at room temperature. After stopping the agitation, the mixture separated into two layers, the lower one of which solidified. The upper water layer was decanted. The lower layer was heated above its melting point, residual water removed under 200 mm. pressure, and the temperature raised for fractionation. At 155° C. to 164° C. and 200 mm. pressure unreacted 1H,1H,9H-hexadecafluoro-1-nonanol was distilled. On reducing the pressure, the desired sulfonate ester distilled at 172° C. at 2.3 mm. The product amounted to 298 g. and was identified as 1H,1H,9H-hexadecafluorononyl p-toluenesulfonate by elemental analysis. It melted at 44.5° C.

| | Percent C | Percent H | Percent F | Percent S |
|---|---|---|---|---|
| Calculated for $C_{16}H_{10}F_{16}O_3S$ | 32.8 | 1.7 | 51.9 | 5.5 |
| Found | 32.8 | 1.7 | 51.1 | 5.5 |

The base which is employed in the process of this invention is a water-soluble base of the formula HNRR' wherein each of R and R' represents a member of the group consisting of hydrogen and an alkyl radical of 1 to 5 carbon atoms, i.e. ammonia and the alkylamines in which the alkyl groups contain 1 to 5 carbon atoms. It has been found that aqueous solutions of such bases readily react with the dispersed sulfonic acid esters of the polyfluoroalkanols at elevated temperatures to form the corresponding polyfluoroalkylamines and ammonium or alkyl-amine salts of the liberated sulfonic acids. The alkylamines and dialkylamines that may be used include methylamine, ethylamine, propylamine, isopropylamine, butylamine, sec.-butylamine, amylamine, dimethylamine, diethylamine, dipropylamine, dibutylamine, and diamylamine. Thus, for example, 1H,1H,3H-tetrafluoropropylamine will be obtained from either 1H,1H,3H-tetrafluoropropyl p-toluenesulfonate or 1H,1H,3H-tetrafluoropropyl methanesulfonate and ammonia; 1H,1H-pentafluoropropylamine from 1H,1H-pentafluoropropyl methanesulfonate and ammonia; 1H,1H,9H-hexadecylfluorononylamine from either 1H,1H,9H-hexadecafluorononyl p-toluenesulfonate or 1H,1H,9H-hexadecafluorononyl methanesulfonate and ammonia; N,N-diethyl-1H,1H,3H-tetrafluoropropylamine from either 1H,1H,3H-tetrafluoropropyl p-toluenesulfonate or 1H,1H,3H-tetrafluoropropyl methanesulfonate and diethylamine; and N,N-dibutyl-1H,1H-pentadecafluorooctylamine from either 1H,1H-pentadecafluorooctyl benzenesulfonate or 1H,1H-pentadecafluorooctyl cyclohexanesulfonate and dibutylamine.

In order for the desired reaction to take place, it is essential that it be carried out in a dispersion of the sulfonic acid ester of the polyfluoroalkanol in an aqueous solution of the water-soluble base. Others have attempted to carry out the reaction in the absence of the aqueous medium, but without success. The base can be added to the water before or after the dispersion of the ester therein, preferably before. The dispersion of the ester in the aqueous medium can be obtained in any convenient manner, of which many are well known in the art. It can be obtained by good agitation or by a dispersing agent, or both. The dispersion is most conveniently obtained and maintained by agitation with the aid of readily available dispersing agents such as alkyl sodium sulfates, sodium alkylarenesulfonates, the sodium salt of a sulfated alkenyl ester represented by alkyl($C_{12}$–$C_{16}$) sodium sulfate, sodium alkyl($C_{12}$ average)-benzenesulfonate, the sodium salt of sulfated alkenyl($C_{16}$-$C_{18}$) acetate, and the like. A particularly convenient dispersing agent is the commercially available sodium alkylarylsulfonate which is sold under the trade name "Nacconol NR" (1958 Technical Manual of the American Association of Textile Chemists and Colorists), and such dispersing agent is used in the examples presented hereinafter.

In these reactions, the stoichiometric amounts of the reactants are two moles of ammonia or alkylamine (referred to hereinafter as amine) for each mole of the polyfluoroalkyl sulfonate ester. One mole of the amine combines with the polyfluoroalkyl radical and one mole forms an amine salt with the liberated sulfonic acid. The preferred mole ratio of the amine reactant to the polyfluoroalkyl sulfonate ester is 2.5 to 1. This ratio provides a 25% excess of the amine to ensure a more complete conversion of the polyfluoroalkyl sulfonate ester. Usually, the amine will be used in a ratio of from about 2 to about 3 moles for each mole of sulfonate ester. At ratios lower than the stoichiometric ratio of 2 to 1, the yield of desired polyfluoroalkylamine product is reduced because there is insufficient amine for a complete reaction with the sulfonate ester. At ratios much higher than 3 to 1, an unnecessary excess of amine is used which has to be recovered or is wasted.

The reaction may be conducted over a range of temperatures of from about 100° C. to about 265° C. At temperatures materially below 100° C., the reaction rate is markedly decreased. At temperatures materially above 265° C., the yield of polyfluoroalkylamine tends to be decreased by hydrolysis of the sulfonate ester to reform the polyfluoroalkanol and liberate the free sulfonic acid. Usually, the process will be carried out at a temperature of from about 115° C. to about 235° C. The preferred reaction temperature varies with the sulfonic acid employed to form the ester and with the chain length or molecular weight of the polyfluoroalkyl group. For example, whereas the 1H,1H,3H-tetrafluoropropyl ester of p-toluenesulfonic acid gives high yields of the polyfluoroalkyl amine by reaction with ammonia at 175° C., the same ester of benzenesulfonic acid gives correspondingly high yields of the amine at 125° C., and the p-bromobenzenesulfonic acid ester will react similarly with ammonia at still lower temperatures. On the other hand, 1H,1H,9H-hexadecafluorononyl benzene - sulfonate requires a temperature of at least 200° C. to form in corresponding yield its polyfluoroalkyl amine.

A low molecular weight, low boiling polyfluoroalkylamine is preferably separated from the reaction mass by distillation. The distillate is a mixture of water and amine which is adjusted to a pH of at least 7.5 and then mixed with ethyl ether to extract the amine. The ether solution is dried and fractionally distilled to obtain pure amine. Optionally, hydrogen chloride gas may be passed into the ether solution to precipitate the polyfluoroalkylamine as the hydrochloride salt. The reaction mass usually contains an excess of ammonia or alkylamine over that required to react with the polyfluoroalkyl sulfonate and to form an amine salt of the liberated sulfonic acid.

A high molecular weight, high boiling polyfluorolkylamine is preferably isolated as the hydrochloride. This is achieved by filtering the reaction mass. Part of the liquid polyfluoroalkylamine appears in a water mixture as the filtrate and part of it is retained by the filter cake. The filter cake is washed first with ethyl ether and then with methanol to extract the amine retained therein. The ether and methanol solutions of extracted material are combined with the filtrate, and the whole mixture is made strongly acid with concentrated hydrochloric acid. The hydrochloric acid salt of the polyfluoroalkylamine is precipitated. It may be filtered, slurried with water, refiltered, and dried.

In order to more clearly illustrate this invention, presently preferred modes of carrying it into effect and advantageous results to be obtained thereby, the following examples are given.

EXAMPLE 1

*1H,1H,3H-Tetrafluoropropylamine*

A one liter capacity stainless steel agitated reaction vessel, wired and jacketed for heating electrically, was charged with 340 ml. of 28% aqueous ammonia solution, 1.7 grams of "Nacconol NR," and 143 grams of 1H,1H,3H-tetrafluoropropyl p-toluenesulfonate. The reaction vessel was then closed, heated to 175° C., and agitated for 24 hours at 175° C. After cooling to about −40° C. and opening the reaction vessel, the partly frozen semi-solid contents were transferred to a distillation flask for a fractional distillation. On warming, ammonia gas escaped. Between a vapor temperature of 45° C. and 95° C. a distillate collected. This distillate was mixed with ethyl ether, and the ether solution was dried with solid sodium hydroxide and then fractionally distilled. A fraction, boiling at 84° C., having a refractive index of $n_D^{20}=1.3291$, and amounting to 30.6 grams, was identified by chemical analysis as 1H,1H,3H-tetrafluoropropylamine.

Calculated for $C_3H_5F_4N$: C, 27.49%; H, 3.82%; F, 57.0%; N, 10.69%. Found: C, 27.4%; H, 3.9%; F, 57.0%; N, 10.65%.

EXAMPLE 2

*1H,1H,9H-Hexadecafluorononylamine Hydrochloride*

Following the general procedure of Example 1, 146 grams of 1,H,1H,9H-hexadecafluorononyl p-toluenesulfonate and 170 ml. of 28% aqueous ammonia solution containing 2.5 g. of "Nacconol NR" were heated for 22 hours at 235° C. After cooling and opening the reaction vessel, its contents was filtered. The material collected on the filter was washed with 150 ml. of ethyl ether and then with 150 ml. of methanol. The ether and methanol solutions of extracted material were combined with the filtrate, and the whole mixture made strongly acid with concentrated hydrochloric acid. The hydrochloric acid salt of 1H,1H,9H-hexadecafluorononylamine precipitated. The filtered precipitate was washed in hot water, refiltered, and dried. The product was analyzed as follows:

Calculated for $C_9H_6F_{16}NCl$: F, 64.9%; Cl, 7.60%; N, 3.0%. Found: F, 63.0%; Cl, 7.98%; N, 3.3%.

EXAMPLE 3

*N-Methyl-1H,1H,3H-Tetrafluoropropylamine*

Following the general procedure and conditions of Example 1, 33 g. (1 mole) of methylamine in 250 ml. of water containing 1.7 g. of "Nacconol NR" was reacted with 148 g. (0.5 mole) of 1H,1H,3H-tetrafluoropropyl p-toluenesulfonate for 5 hours at 175° C. After transfer to a distillation flask, the reaction mixture was made alkaline with sodium hydroxide solution. A liquid distillate, collected between 68° C. and 75° C., was redistilled in a spinning band column. A fraction, boiling at 89° C. to 90° C., having a refractive index of $n_D^{20}=1.3335$, and weighing 21 grams, proved by analysis to be N-methyl-1H,1H,3H-tetrafluoropropylamine.

Calculated for $C_4H_7F_4N$: C, 33.1%; H, 4.83%; F, 52.4%; N, 9.65%. Found: C, 32.9%; H, 5.0%; F, 51.4%; N, 9.6%.

EXAMPLE 4

*N,N-Diethyl-1H,1H,3H-Tetrafluoropropylamine*

Following the general procedure of Example 1, 78.3 g. (1.07 mole) of diethylamine in 250 ml. of water containing 2.0 g. of "Nacconol NR" was reacted with 148 g. (0.5 mole) of 1H,1H,3H-tetrafluoropropyl p-toluenesulfonate for 5 hours at 175° C. After transfer to a distillation flask, the reaction mixture was made strongly alkaline with sodium hydroxide solution. Most of the amine product distilled in the range of 60° C. to 96° C. The semi-refined product was dried over calcium chloride, filtered and redistilled in a spinning band column. The refined N,N-diethyl - 1H, 1H, 3H-tetrafluoropropylamine product, amounting to 60 grams, had a boiling point of 127° C. at 760 mm. and a refractive index of $$n_D^{20} = 1.3607$$

It was analyzed chemically with the following results.
Calculated for $C_7H_{13}F_4N$: C, 44.85%; H, 6.95%; F, 40.6%; N, 7.48%. Found: C, 44.8%; H, 7.3%; F, 40.2%; N, 7.6%.

EXAMPLE 5

1H,1H-Pentafluoropropylamine

PREPARATION OF 1H,1H-PENTAFLUOROPROPYL METHANESULFONATE

To a mixture of 241 g. (1.61 mols) of 1H,1H-pentafluoro-1-propanol and 397 ml. of pyridine, in a round bottom glass reaction vessel fitted with a stirrer and a thermometer, 193 g. (1.61 mols) of methanesulfonyl chloride was added dropwise over a period of two hours while maintaining the temperature of the reaction mass between 5° C. and 10° C. The mixture was allowed to warm to room temperature as the stirring was continued overnight. The reaction mixture was then poured into a slurry of 500 ml. of water and 170 g. of sodium acid carbonate, and the resulting mixture was stirred well and filtered. The lower, water-insoluble layer that separated from the filtrate was withdrawn and dried over anhydrous magnesium sulfate. On distillation, a cut was taken at 112° C. to 114° C. at 70 mm. Hg pressure. This collected product weighed 269 g., represented a yield of 73.4%, had a refractive index of $n_D^{20} = 1.3562$ and was identified by chemical analysis as 1H,1H-pentafluoropropyl methanesulfonate.

Calculated for $C_4H_5F_5O_3S$: C, 21.05%; H, 2.19%; F, 41.7%; S, 14.04%. Found: C, 20.8%; H, 2.3%; F, 41.5%; S, 14.0%.

PREPARATION OF 1H,1H-PENTAFLUOROPROPYLAMINE

A one-liter stainless steel agitated reaction vessel, wired and jacketed for heating electrically, was charged with 340 ml. of 28% aqueous ammonia solution, 1.7 g. of a sodium alkylarylenesulfonate ("Nacconol NR") and 114 g. (0.5 mol) of 1H,1H-pentafluoropropyl methanesulfonate prepared as described above. The reactor was closed, heated to 175° C., and agitated for 24 hours at 175° C. The reactor and its contents were then cooled in a solid carbon dioxide/acetone bath before being opened. The semi-solid contents were transferred to a distillation flask for a fractional distillation. On warming, ammonia gas escaped and was collected in a trap cooled with a solid carbon dioxide/acetone mixture. The distillate was collected up to a vapor temperature of 96° C. The distillate was combined with the condensate in the ammonia trap. The lower, water-insoluble layer that separated (18 g.) was withdrawn and distilled on a spinning band column. A cut, boiling at 38° C., was identified by chemical analysis as 1H,1H-pentafluoropropylamine.

Calculated for $C_3H_4F_5N$: C, 24.1%; H, 2.68%; F, 63.75%; N, 9.39%. Found: C, 23.8%; H, 2.9%; F, 63.6%; N, 9.0%.

PREPARATION OF 1H,1H-PENTAFLUOROPROPYLAMINE HYDROCHLORIDE

A 5 g. portion of 1H,1H-pentafluoropropylamine, prepared as described above, was dissolved in about 25 ml. of dry ethyl ether. Into the ether solution was passed dry gaseous hydrogen chloride to precipitate the hydrochloride salt of the amine. The salt was filtered, and its identity confirmed by chemical analysis.

Calculated for $C_3H_5F_5NCl$: C, 19.15%; F, 51.2%; N, 7.55%. Found: C, 19.5%; F, 51.5%; N, 7.5%.

EXAMPLE 6

1H,1H,3H-Tetrafluoropropylamine From 1H,1H,3H-Tetrafluoropropyl Benzenesulfonate A one liter nickel reaction vessel was charged with 245 g. of 1H,1H,3H-tetrafluoropropyl benzenesulfonate, 500 ml. of 28% aqueous ammonia solution, and 4 g. of "Nacconol NR" and heated 8 hours at 125° C. with agitation. The reaction mass was then cooled to room temperature and distilled to a vapor temperature of 95° C. at atmospheric pressure. The distillate was shaken with ethyl ether and the ether solution was dried over anhydrous sodium sulfate and filtered. After removal of the ether, an 85 g. fraction boiling at 84° C. was collected and identified as 1H,1H,3H-tetrafluoropropylamine by vapor phase chromatograph, infrared, and nuclear magnetic resonance patterns.

EXAMPLE 7

N-Methyl-1H,1H,3H-Tetrafluoropropylamine From 1H,1H,3H-Tetrafluoropropyl Benzenesulfonate A one liter nickel reaction vessel was charged with 82 g. of 1H,1H,3H-tetrafluoropropyl benzenesulfonate, 180 ml. of a 30% water solution of methylamine, and 2 g. of "Nacconol NR" and heated 16 hours at 115° C. with agitation. The reaction mass was cooled to room temperature, treated with 30 g. of a 30% water solution of sodium hydroxide, and distilled to a vapor pressure of 100° C. On working up the distillate as in Example 6, 31 g. of N-methyl-1H,1H,3H-tetrafluoropropylamine, boiling at 91° C., was obtained. The identity of the product was confirmed by infrared, nuclear magnetic resonance and elemental chemical analysis.

EXAMPLE 8

1H,1H,9H-Hexadecafluorononylamine From 1H,1H,9H-Hexadecafluorononyl Benzenesulfonate By the procedure of Example 6, 117 g. of 1H,1H,9H-hexadecafluorononyl benzenesulfonate and 140 ml. of 28% ammonia solution were reacted under agitation in the presence of 2 g. of "Nacconol NR" for 16 hours at 200° C. The reaction mass was cooled to room temperature and steam distilled. An oil layer amounting to 54 g. was collected. The oil was dissolved in ether and the ether solution was dried. A fraction, distilling at 200 mm. at 147° C. to 149° C., was collected and identified by vapor phase chromatograph, infrared, and nuclear magnetic resonance patterns as 1H,1H,9H-hexadecafluorononylamine.

It will be understood that the preceding examples have been given for illustrative purposes solely and that this invention is not limited to the specific embodiments described therein. On the other hand, it will be readily understood by those skilled in the art that, subject to the limitations set forth in the general description, many variations can be made in the materials, proportions, conditions, and techniques employed without departing from the spirit or scope of this invention.

This is a continuation-in-part of my copending applications Serial No. 817,977, filed June 4, 1959, and Serial No. 822,748, filed June 25, 1959, both now abandoned.

From the preceding description, it will be apparent that this invention constitutes a novel process for preparing a well known class of valuable polyfluoroalkylamines. The process is direct, simple and easy to carry out, employing readily available starting materials and producing the desired products in high yields. Therefore, it is believed that this invention constitutes a valuable contribution to and advance in the art.

The embodiments of the invention in which an exclusive property or privilege is claimed are defined as follows:

1. The process for preparing a polyfluoroalkylamine which comprises reacting at a temperature of from about 100° C. to about 265° C. an aqueous dispersion of about 1 mole of a sulfonic acid ester of a polyfluoroalkanol with from about 2 to about 3 moles of a water-soluble base of the formula HNRR' wherein each of R and R' represents a member of the group consisting of hydrogen and an alkyl radical of 1 to 5 carbon atoms, said sulfonic acid having the formula A—SO$_2$—OH wherein A represents a member of the group consisting of an aryl radical of 6 to 20 carbon atoms and 1 to 2 benzene rings, a halogen substituted aryl radical of 6 to 20 carbon atoms and 1 to 2 benzene rings in which the halogen substituents consist of 1 to 2 halogen atoms of the group consisting of chlorine and bromine, and a saturated hydrocarbon radical of 1 to 12 carbon atoms, and the polyfluoroalkanol has the formula X(CF$_2$)$_n$CH$_2$OH wherein X represents a member of the group consisting of hydrogen and fluorine and $n$ represents an integer of from 2

2. The process for preparing a polyfluoroalkylamine which comprises reacting at a temperature of from about 125° C. to about 235 C. an aqueous dispersion of about 1 mole of an arene sulfonic acid ester of ammonia polyfluoroalkanol with from about 2 to about 3 moles of a said arene sulfonic acid having the formula

A—SO$_2$—OH wherein A represents a substituted benzene radical in which the substituents consist of 1 to 2 alkyl groups of 1 to 4 carbon atoms, and the polyfluoroalkanol has the formula H(CF$_2$)$_n$CH$_2$OH wherein $n$ represents an integer of from 2 to 12.

3. The process for preparing 1H,1H,3H-tetrafluoropropylamine which comprises reacting at a temperature of from about 175° C. to about 235° C. an aqueous dispersion of about 1 mole of the p-toluene monosulfonic acid ester of 1H,1H,3H-tetrafluoro-1-propanol with from about 2 to about 3 moles of ammonia.

4. The process for preparing 1H,1H,9H - hexadecafluorononylamine hydrochloride which comprises reacting at a temperature of from about 175° C. to about 235° C. an aqueous dispersion of about 1 mole of the p-toluene monosulfonic acid ester of 1H,1H,9H-hexadecafluoro-1-nonanol with from about 2 to about 3 moles of ammonia.

5. The process for preparing N-methyl - 1H,1H,3H-tetrafluoropropylamine which comprises reacting at a temperature of from about 175° C. to about 235° C. an aqueous dispersion of about 1 mole of the p-toluene monosulfonic acid ester of 1H,1H,3H-tetrafluoro-1-propanol with from about 2 to about 3 moles of methylamine.

6. The process for preparing N,N-diethyl-1H,1H,3H-tetrafluoropropylamine which comprises reacting at a temperature of from about 175° C. to about 235° C. an aqueous dispersion of about 1 mole of the p-toluene monosulfonic acid ester of 1H,1H,3H-tetrafluoro-1-propanol with from about 2 to about 3 moles of diethylamine.

7. The process for preparing a polyfluoroalkylamine which comprises reacting at a temperature of from about 115° C. to about 235° C. an aqueous dispersion of about 1 mole of a polyfluoroalkanol ester of methanemonosulfonic acid with from about 2 to about 3 moles of ammonia, said polyfluoroalkanol having the formula F(CF$_2$)$_n$CH$_2$OH wherein $n$ represents an integer of from 2 to 12.

8. The process for preparing 1H,1H-pentafluoropropylamine which comprises reacting at a temperature of from about 115° C. to about 235° C. an aqueous dispersion of about 1 mole of the methanemonosulfonic acid ester of 1H,1H-pentafluoro-1-propanol with from about 2 to about 3 moles of ammonia.

References Cited in the file of this patent

UNITED STATES PATENTS 2,716,134    Reynolds et al. _____ Aug. 23, 1955

OTHER REFERENCES

Autenrieth et al.: Ber., volume 37, pages 3800–9 (1904).

Freudenberg et al.: Ann., volume 448, pages 121–33 (1926).

Sidgwick: "Organic Chemistry of Nitrogen," page 157 (1949).

UNITED STATES PATENT OFFICE
CERTIFICATE OF CORRECTION

Patent No. 3,118,945

January 21, 1964

Werner V. Cohen

It is hereby certified that error appears in the above numbered patent requiring correction and that the said Letters Patent should read as corrected below.

Column 9, line 16, after "from 2" insert -- to 12. --; line 20, for "ammonia" read -- a --; line 22, for "a" read -- ammonia, --.

Signed and sealed this 16th day of June 1964.

(SEAL)
Attest:

ERNEST W. SWIDER
Attesting Officer

EDWARD J. BRENNER
Commissioner of Patents